(12) United States Patent
Fortino

(10) Patent No.: US 6,840,503 B2
(45) Date of Patent: Jan. 11, 2005

(54) RIGHT-ANGLE VALVE CLOSURE SYSTEM

(75) Inventor: Richard D. Fortino, Alma, MI (US)

(73) Assignee: Powell Technologies LLC, St. Louis, MI (US)

( * ) Notice: Subject to any disclaimer, the term of this patent is extended or adjusted under 35 U.S.C. 154(b) by 0 days.

(21) Appl. No.: 10/716,042

(22) Filed: Nov. 18, 2003

(65) Prior Publication Data

US 2004/0099834 A1 May 27, 2004

Related U.S. Application Data

(60) Provisional application No. 60/427,515, filed on Nov. 19, 2002.

(51) Int. Cl.[7] ............................................. F16K 31/04
(52) U.S. Cl. ................................... 251/248; 251/248.5
(58) Field of Search ........................ 251/14, 248, 249.5, 251/304; 464/23, 170; 403/335, 336, 337, 338, 355, 321, 316, 319

(56) References Cited

U.S. PATENT DOCUMENTS

| | | | | |
|---|---|---|---|---|
| 4,519,639 A | * | 5/1985 | Florian | 285/415 |
| 4,637,423 A | * | 1/1987 | Gray | 137/382.5 |
| 4,776,363 A | * | 10/1988 | Avelli | 137/296 |
| 4,901,977 A | * | 2/1990 | Hendrick | 251/249.5 |
| 6,105,595 A | * | 8/2000 | Jensen | 137/15.12 |

* cited by examiner

*Primary Examiner*—Edward K. Look
*Assistant Examiner*—John K. Fristoe, Jr.
(74) *Attorney, Agent, or Firm*—George L. Boller

(57) ABSTRACT

An air motor (34) is arranged at a right angle to the valve stem (54), through a right angle gear drive (36) that provides torque amplification. A bracket (40) associates the motor with the valve body (48), having a flat ring (68) that fits over the valve body and has clearance notches (94) providing circumferential indexing. Semi-circular locking plates (66) are axially adjacent the ring and pivoted for swinging between a locking position where they fit in a groove (59) in the valve body and an unlocking position where they are free of the groove. Each locking plate has several through-holes through any of which a locking pin (42) can pass to lock the locking plate in locking position. Each locking pin protrudes axially beyond the ring to present interference with the valve body preventing the bracket from turning when the motor operates.

22 Claims, 10 Drawing Sheets

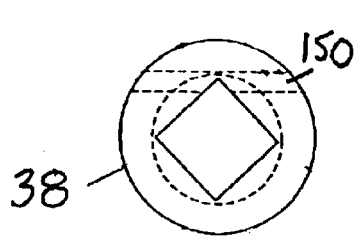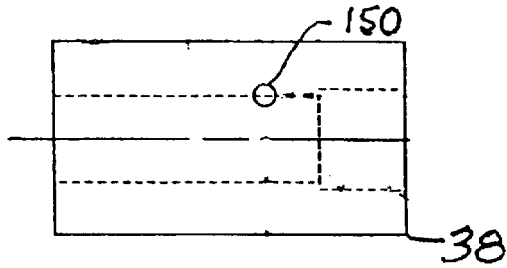
Figure 22    Figure 21
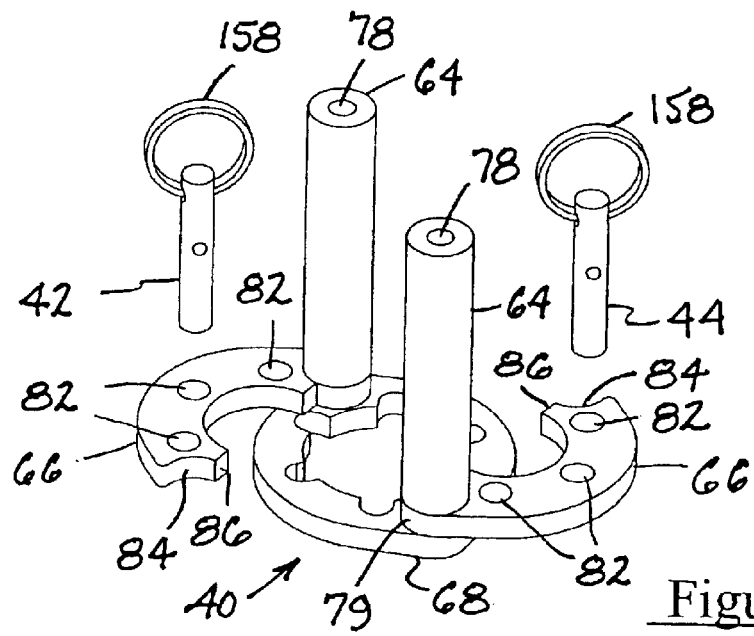
Figure 23
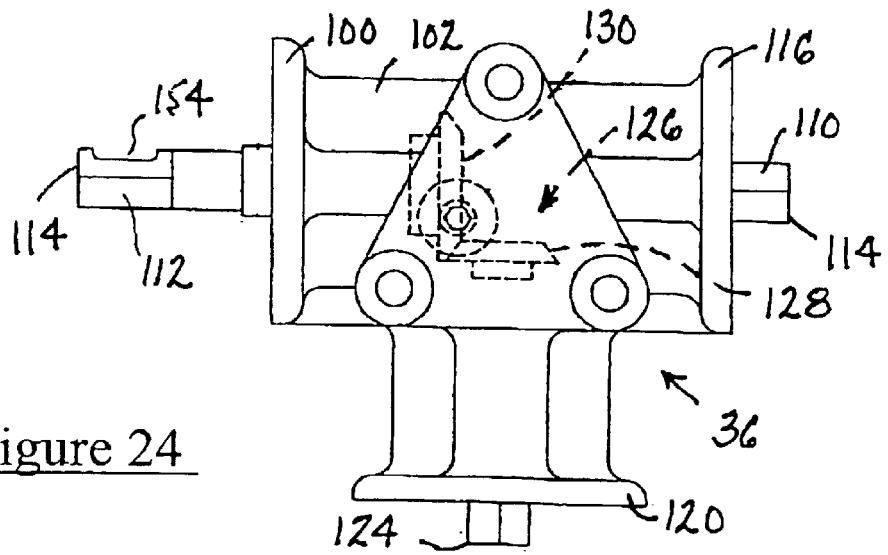
Figure 24

RIGHT-ANGLE VALVE CLOSURE SYSTEM

REFERENCE TO RELATED APPLICATION AND PRIORITY CLAIM

This application derives from the following commonly owned patent application, the priority of which is expressly claimed: Provisional Application No. 60/427,515, filed on 19 Nov. 2002 in the name of RICHARD FORTINO.

FIELD OF THE INVENTION

This invention relates to a valve closure system comprising a motor for turning a rotary actuator of a valve to operate the valve from open to closed. Such valve closure systems allow valves of vessels, such as cylinders and containers, that hold fluids, such as industrial gases for example, to be quickly operated from a remote location.

BACKGROUND OF THE INVENTION

Various types of transportable vessels are used for packaging various commercial and industrial gases at superatmospheric pressure. One type of vessel is a gas cylinder, an example of which is an elongate metal tank adapted to contain gas at relatively high pressure. An upper axial end of the cylinder has a neck containing an opening to the interior. A shut-off valve is mounted in closure of the neck opening. Another type is a container, a vessel that may have substantially larger volume than a cylinder. A container may have several such shut-off valves each mounted in closure of a respective opening in the container wall.

A representative shut-off valve comprises a first port fitted in sealed relation to an opening in a vessel wall, a second port, and a valve mechanism that is operable via an external actuator, handle, or tool, to allow and disallow fluid communication between the two ports. The second port is externally available for connection to a gas supply source when the cylinder is to be filled and for connection to a gas utilization system at a facility that uses gas stored in the cylinder. The valve mechanism comprises a stem that is rotated by the external actuator, handle, or tool to open and close the valve. An external actuator may be either manual or powered. An electric- or pneumatic-powered prime mover is an example of a power actuator. A wrench is an example of a hand tool for turning the valve stem.

The representative valve may be a globe style valve whose stem is rotatable more than one full turn between closed and full open positions. Opening the valve allows contained gas to pass from the vessel by entering the first port, flowing through the valve, and exiting via the second port. In such case, the first port forms a gas inlet connected to the vessel, and the second port a gas outlet. The gas outlet may be connected via a conduit to a point of use of the gas.

Such vessels can hold gases that may be considered hazardous, examples of such gases including chlorine and sulfur dioxide. A facility that utilizes one or more of such gases in a process, or processes, conducted at the facility may, for example, have any number of such vessels containing the same or different gases on the premises. When connected to a gas handling system at the facility, such vessels are able to deliver gas, or gases, into the system once their shut-off valves have been opened. Because of inherent characteristics of certain gases, vessels that contain them may be housed in locations that are remote from attending personnel, and/or the vessels may be in use at times when personnel are absent.

When a vessel, or vessels, is, or are, in use at a facility, and gas leakage is detected, it may be appropriate to shut off all vessels in an attempt to minimize further gas leakage. Accordingly, an automatic gas leak detection and valve shut-off system may be employed at a facility to address such a situation. Such a system may include a power actuator associated with the shut-off valve of each vessel. Examples of known valve closure systems include electromechanical actuators and pneumatic actuators.

Commonly owned U.S. Pat. No. 6,170,801 discloses a valve closure system that mounts on a gas-containing vessel in association with a valve having a rotatable stem that opens and closes the valve. The closure system comprises a mounting bracket and an air motor. With the valve open, the bracket is fit to the valve and a coupling on an external end of the air motor shaft is fit to the stem. The long axis of the air motor is coincident with the axis of the stem. When pressurized air is delivered to the air motor, the motor shaft rotates the stem in a sense that closes the valve. The long axis of the motor adds to the overall length of the closure system. With turning of the valve stem being in one-to-one correspondence (i.e. a 1:1 ratio) to turning of the motor shaft, the air motor must be able to deliver output torque corresponding to the torque requirement for the valve.

SUMMARY OF THE INVENTION

The present invention relates to further improvements in valve closure systems for fluid-containing vessels, the term "fluid" including both liquids and gases. Briefly, the invention comprises, in the disclosed preferred embodiment, an organization and arrangement where the long axis of the air motor is arranged at a right angle to the axis of the valve stem. The air motor is operatively coupled to the stem through a right angle gear drive that provides torque amplification.

The gear drive comprises a housing having opposite end faces from which opposite ends of a main shaft protrude. A bracket that comprises an assembly of several individual parts is assembled to the housing at a first of those two end faces. The bracket assembly serves to mount the closure system on the body of the valve. A coupler on the end of the main shaft that protrudes from the first end face aligns with and fits to the valve stem. The housing also has a side face that is disposed at a right angle to the first end face. The air motor is fastened to the side face.

The drive further comprises a stub shaft whose axis is transversely perpendicular to the axis of the main shaft. An outer end of the stub shaft protrudes from the housing at the side face, and the motor output shaft is coupled to that end of the stub shaft via a coupler.

Within the enclosed interior of the drive housing is a beveled gear set. One gear of the set is disposed on the interior end of the stub shaft, while the other gear of the set is disposed on the main shaft. Rotation of either one of the two shafts rotates the other via the gear set.

By providing the gear set with a suitable gear ratio, it becomes possible to multiply the air motor torque so that the actual torque that turns the valve shaft exceeds the torque that the motor would apply if it were directly coupled to the valve stem without the torque multiplication provided by the gear set. For a given valve closure torque requirement, the torque that an air motor is required to deliver can therefore be smaller when compared to the prior valve closure system of the commonly owned patent. This can enable a less expensive air motor to be used in certain applications. Because air motors may be commercially available in only certain sizes, the torque multiplication may preclude the need to choose an oversize motor and then use a pressure regulator to reduce the torque to a desired level.

Moreover, the mounting of the air motor with its long axis at a right angle to the axis of the valve stem may result in a more efficient use of space such as when the valve closure system is used with a gas cylinder that is supported horizontally in a rack rather than being stood upright. In such an installation, the valve closure system will protrude horizontally from the cylinder significantly less than if the air motor long axis is aligned with the valve stem, and therefore also horizontal.

A still further advantage of the invention is that the valve may be operated manually while the closure system remains mounted on a cylinder. This is because the protruding end of the main shaft of the gear drive opposite the shaft end coupled with the valve stem is readily accessible for turning by using a suitable handle or tool.

Still another advantage of the invention is that the valve closure system can be indexed on a valve at time of mounting so that the air motor points in a desired one of several available directions provided by the ability to index it. Once indexed in the desired orientation, locking plates of the bracket are swung closed onto the valve body, and locking pins are inserted through holes in the locking plates and holes in a base plate of the bracket that register with the holes in the locking plates when the latter are closed. Because the mounting circumferentially girdles the valve body, it is not prone to cocking on the valve body when the air motor operates.

The preferred embodiment of the inventive closure system is well suited for use with known, and commonly used, gas shut-off valves, although certain principles are generic to use of the inventive system with different forms of shut-off valves. Certain principles of the invention may also extend to valve closure systems in which the fluid storage medium is a form of storage vessel other than the particular container and cylinder vessels mentioned above.

BRIEF DESCRIPTION OF DRAWINGS

The accompanying drawings, which are incorporated herein and constitute part of this disclosure, illustrate a presently preferred embodiment of the invention, and together with the written description given herein disclose principles of the invention in accordance with a best mode contemplated at this time for carrying out the invention.

FIG. 21 is a longitudinal view of still another part by itself.

FIG. 22 is a left end view of FIG. 21.

FIG. 23 is an exploded perspective view of a bracket assembly formed, in part, by the parts of FIGS. 8-18 and including additional parts.

FIG. 24 is a longitudinal view of a gear drive by itself.

DETAILED DESCRIPTION

Figure 19:
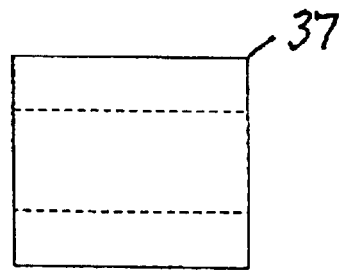
FIG. 19 is a longitudinal view of still another part by itself.
Figure 20:
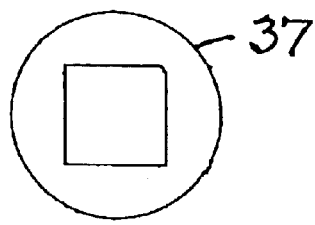
FIG. 20 is an end view of FIG. 19.
Figure 25:
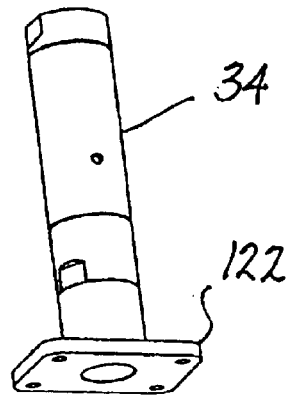
FIG. 25 is a perspective view of an air motor.
Figure 27:
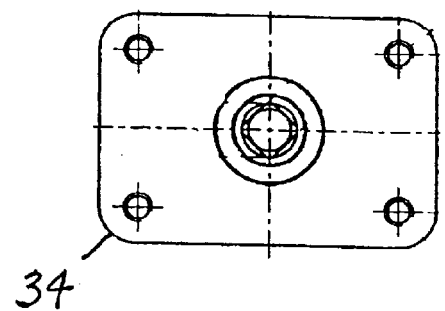
FIG. 27 is a bottom end view in the direction of arrows 27—27 in FIG. 26.
Figure 26:
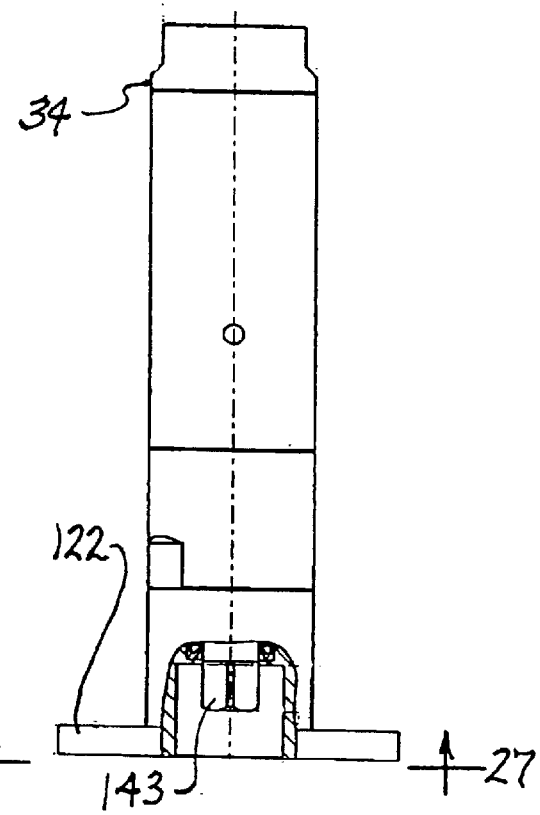
FIG. 26 is an enlarged longitudinal view of the air motor of FIG. 25.
Figure 28:
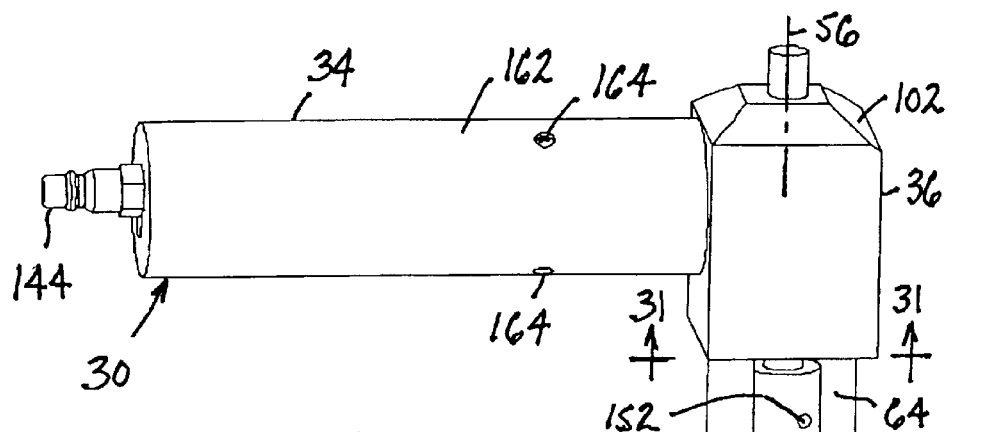
FIG. 28 is a view showing the closure system associated with a valve, portions of the closure system shown in this Figure being different from previous Figures.
Figure 30:
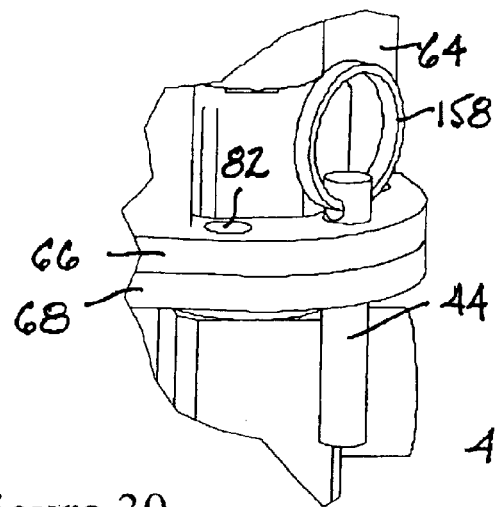
FIG. 30 is an enlarged view in circle 30 of FIG. 28.

The drawing Figures illustrate a presently preferred embodiment of cylinder valve closure system 30 according to principles of the invention intended for association with a cylinder valve 32, as in FIG. 28. System 30 includes an air motor 34 (FIGS. 25-27), a gear drive 36 (FIG. 24), a female input drive coupler 37 (FIGS. 19-20), a female output drive coupler 38 (FIGS. 21-22), and a bracket 40 (partly shown in FIG. 23). Additional parts include locking pins 42, 44 (FIG. 23), and various fasteners, not all of which appear in the Figures.

Figure 29:
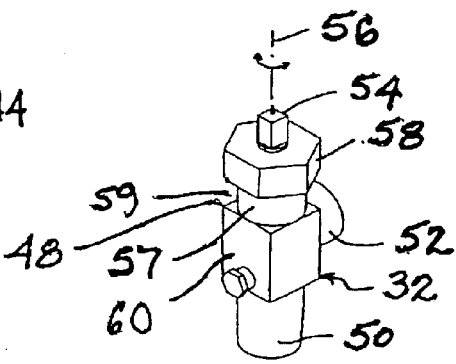
FIG. 29 is a perspective view of the valve by itself rotated lightly from the orientation shown in FIG. 28.

Valve 32, as shown by itself in FIG. 29, is a commercially available cylinder tank shut-off valve that comprises a body 48 having a first port 50 at the bottom and a second port 52 at a side. Port 50 is adapted to fit in sealed closure of an opening in a neck at the top of a gas cylinder (not shown). Port 52 is adapted for connection to a gas supply source when the cylinder is to be filled with gas. When the cylinder is in use at a facility, port 52 is connected to a gas handling system through which gas can flow from the cylinder to a point of use at the facility.

Valve 32 further includes an operating mechanism comprising a valve element within body 48 that is operated to open and close an internal gas flow path between ports 50 and 52. The valve element is operated by turning an actuator, which for the illustrated valve, is a stem 54 on the exterior of body 48. The turning of stem 54 occurs about an axis 56. Stem 54 has a polygonally-shaped transverse cross section (a square shape for example) that can be engaged by a complementary shaped tool or socket for turning the stem. At the location where stem 54 protrudes from valve body 46 is a hexagonal-shaped head 58 that is concentric with axis 56. Immediately below, and concentric with head 58, is a circular cylindrical wall 57 that endows valve body 48 with a circular groove 59 between head 58 and a lower generally rectangular body portion 60.

Figure 5:
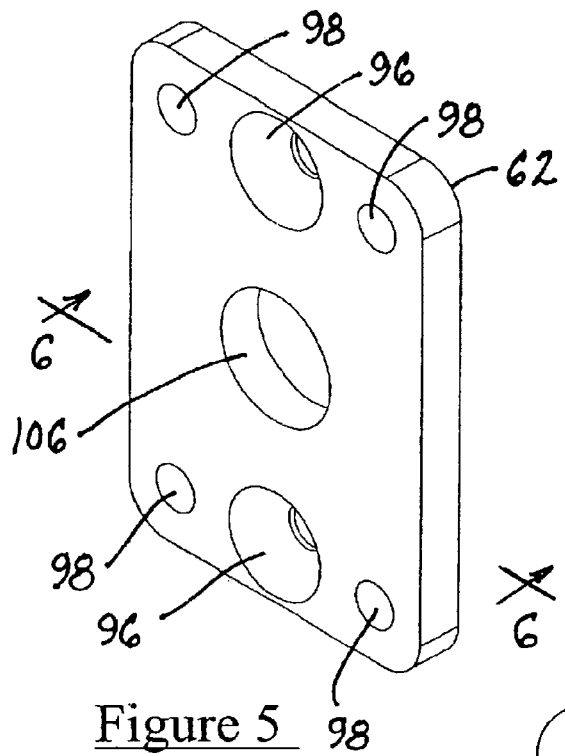
FIG. 5 is a perspective view of one of the parts shown by itself.
Figure 6:
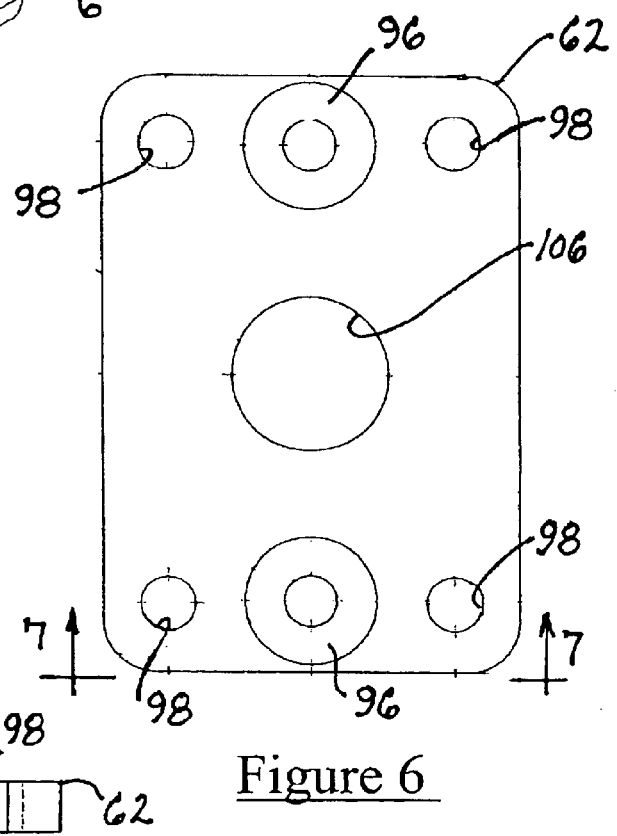
FIG. 6 is a plan view of the part of FIG. 5, taken in the direction of arrows 6—6 in the latter Figure.
Figure 7:
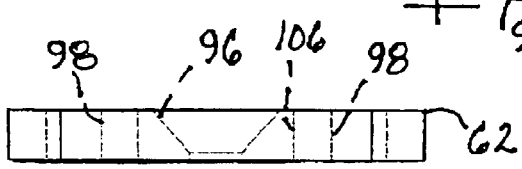
FIG. 7 is a side view in the direction of arrows 7—7 in FIG. 6.
Figure 8:
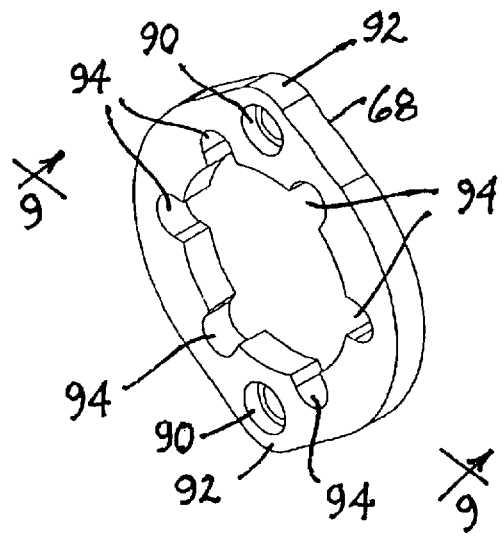
FIG. 8 is a perspective view of another one of the parts shown by itself.
Figure 10:
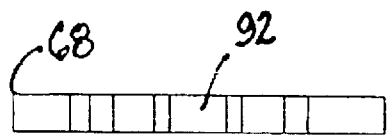
FIG. 10 is a side elevation view in the direction of arrows 10—10 in FIG. 9.
Figure 9:
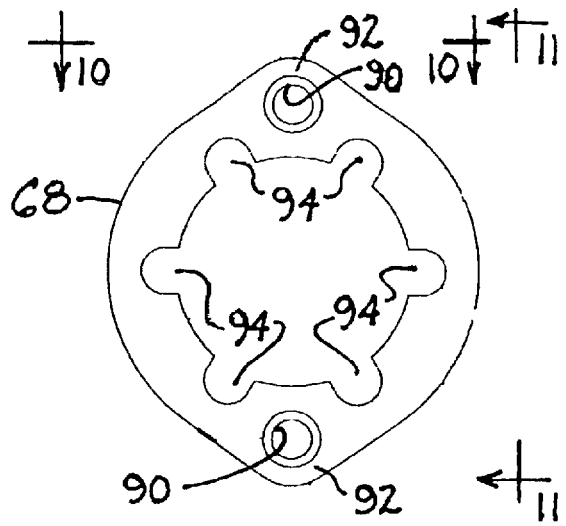
FIG. 9 is a plan view of the part of FIG. 8, taken in the direction of arrows 9—9 in the latter Figure.
Figure 11:
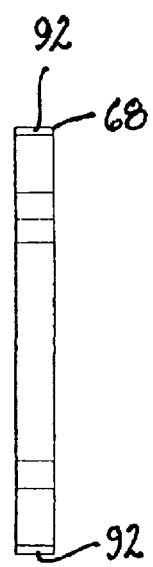
FIG. 11 is a side elevation view in the direction of arrows 11—11 in FIG. 9.
Figure 12:
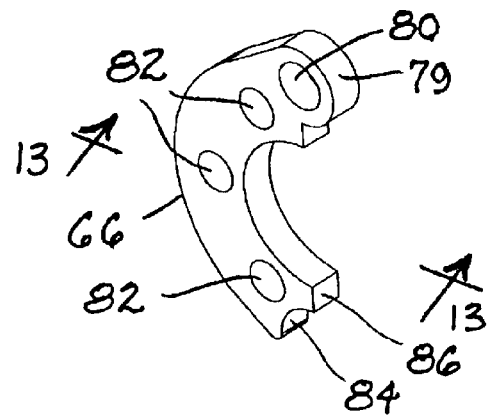
FIG. 12 is a perspective view of still another one of the parts shown by itself.
Figure 14:
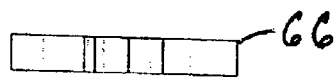
FIG. 14 is a side elevation view in the direction of arrows 14—14 in FIG. 13.
Figure 13:
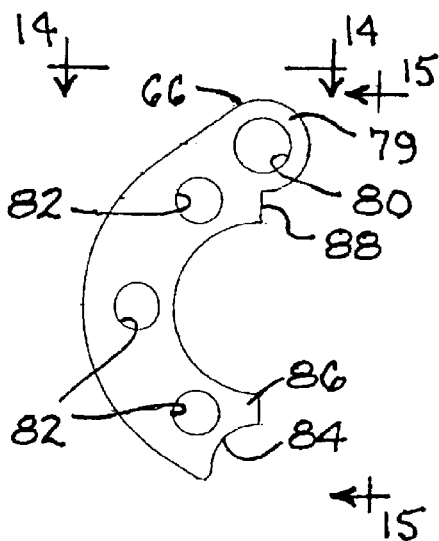
FIG. 13 is a plan view of the part of FIG. 12, taken in the direction of arrows 13—13 in the latter Figure.
Figure 15:
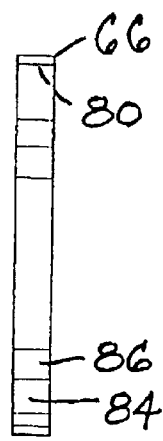
FIG. 15 is a side elevation view in the direction of arrows 15—15 in FIG. 13.
Figure 17:
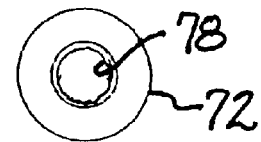
FIG. 17 is a top view of FIG. 16.
Figure 16:
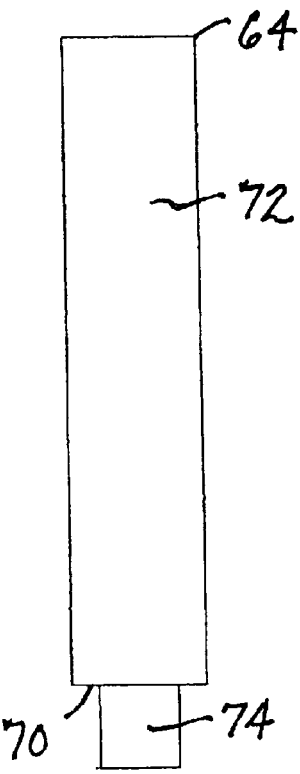
FIG. 16 is an elevation view of still another part by itself.
Figure 18:
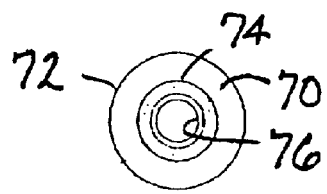
FIG. 18 is a bottom view of FIG. 16.

Bracket 40 comprises an assembly of one adapter plate 62, two posts 64, two locking plates 66, and one base plate 68. FIGS. 5-7 show detail of adapter plate 62; FIGS. 8-11 show detail of base plate 68; FIGS. 12-15 show detail of a locking plate 66; and FIGS. 16-18 show detail of a post 64.

Each post 64 comprises a shoulder 70 that joins a larger diameter portion 72 forming most of the post length from a smaller diameter portion 74. Tapped holes 76, 78 are in opposite ends of each post.

Each locking plate 66 has a generally semi-circular shape centered on an imaginary axis that in closure system 30 is coincident with axis 56. It also has a uniform thickness. At a proximal end of its generally semi-circular extent, locking plate 66 has a somewhat semi-circular tab, or ear, 79 that contains a through-hole 80. Beyond through-hole 80 in the counterclockwise direction in FIG. 13, locking plate 66 has a succession of three smaller through-holes 82. At the distal end opposite tab 79, locking plate 66 a concave recess 84. Radially inward of recess 84, plate 66 has a small projection 86. The end edge surface of plate 66 formed by recess 84 has a shape that is essentially congruent to the end edge surface formed by tab 79. Radially inward of tab 79 is a recess 88 forming an end edge surface that is essentially congruent to the end edge surface formed by projection 86.

Each of the two locking plates 66 is associated with a corresponding post 64 by fitting the smaller diameter portion 74 of the post to through-hole 80, disposing base plate 68 against the ends of the post portions 74 with countersunk through-holes 90 that are diametrically opposite each other in base plate 68 aligned with tapped holes 76 in the posts, and then securely fastening the base plate to the posts using fasteners (not shown) that pass is through through-holes 90 and thread into holes 76. The thickness of each locking plate 66 is slightly less than the length of each post portion 74 so that the locking plates are effectively hinged for swinging motion on the posts, as suggested by FIG. 23.

Figure 4:
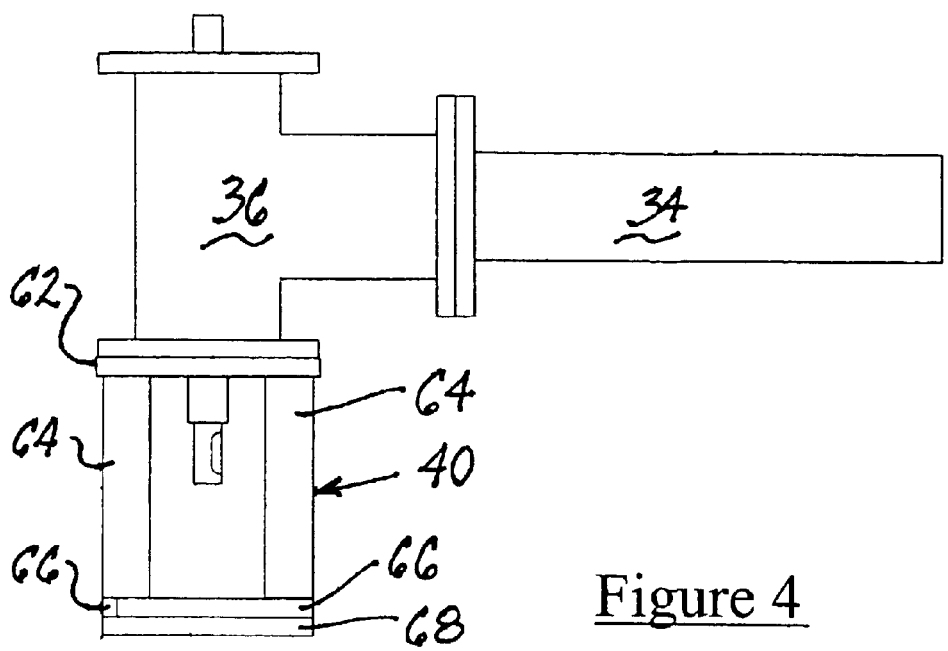
FIG. 4 is a side elevation view in the direction of arrows 4—4 in FIG. 3.
Figure 1:
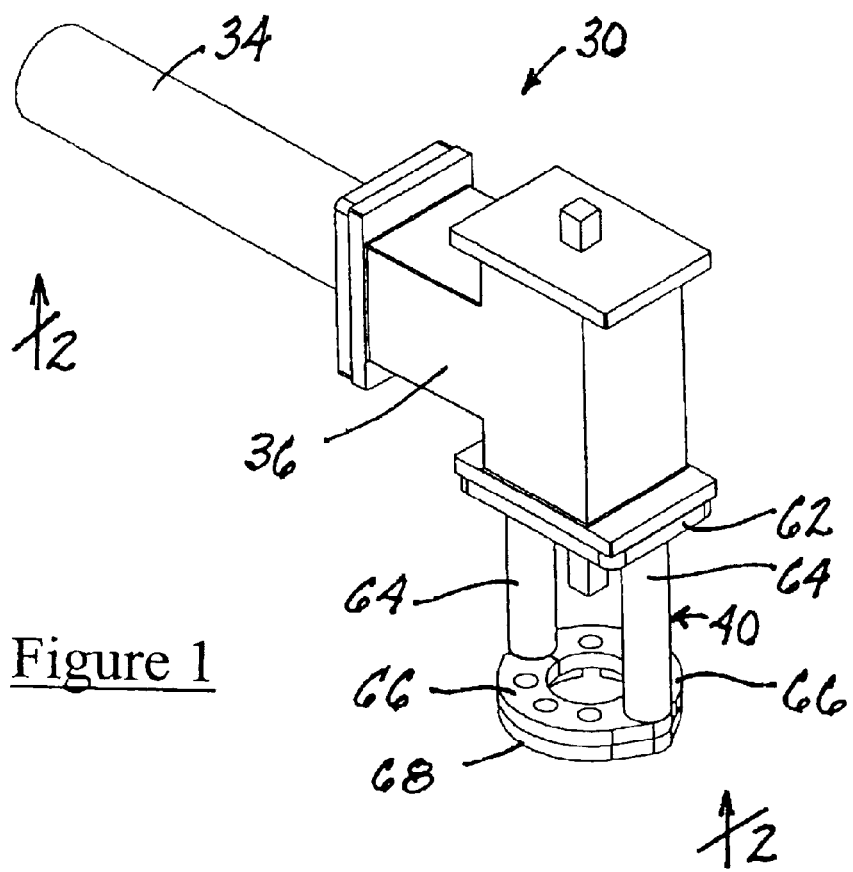
FIG. 1 is a perspective view showing the general organization and arrangement of one embodiment of valve closure system according to the invention.
Figure 3:
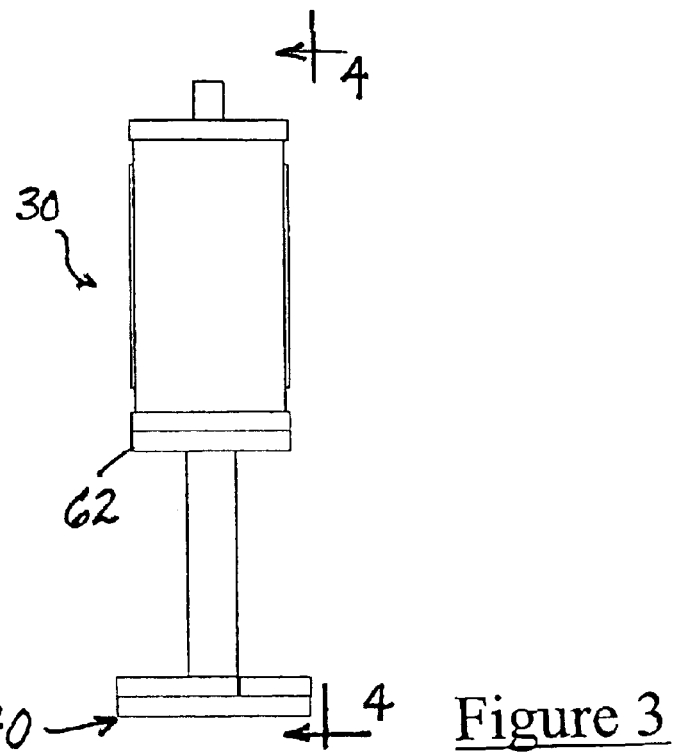
FIG. 3 is a front elevation view in the direction of arrows 3—3 in FIG. 2.
Figure 2:
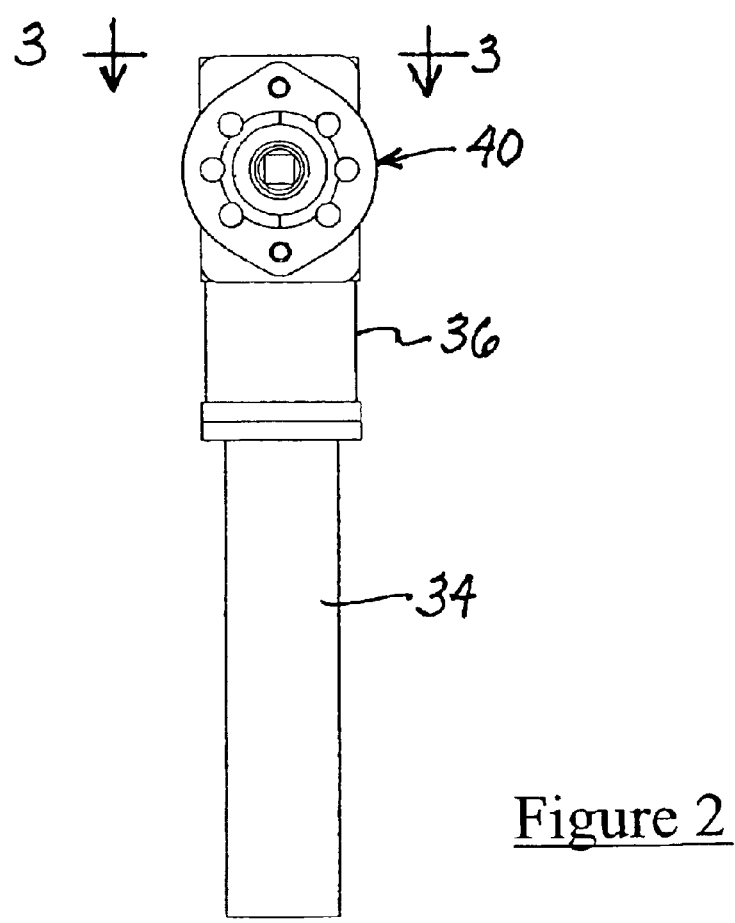
FIG. 2 is a bottom view of FIG. 1 as taken in the direction of arrows 2—2 in the latter Figure.

Base plate 68 is essentially a circular ring of uniform thickness centered on axis 56 in closure system 30. It has modest radial protrusions 92 at the locations of through-holes 90. Between protrusions 92, the width of the ring is nominally uniform, but the inside diameter is interrupted by a succession of three notches 94 in each semi-circumference. When locking plates 66 are swung to the closed position show in FIGS. 1 and 28, each through-hole 82 registers with a respective notch 94.

Adapter plate 62 has a generally uniform thickness and a generally rectangular shape in plan. It serves to adapt bracket 40 for mounting on gear drive 36. At the midpoints of its shorter side margins, plate 62 has countersunk through-holes 96 that register with tapped holes 78 in posts 64. Fasteners (not shown) pass through through-holes 96 and are tightly threaded to holes 78 to secure adapter plate 62 to the posts.

At its four corners, adapter plate 62 has through-holes 98 by which the adapter plate fastens to a flange 100 of a housing 102 of gear drive 36 using fasteners 104. At its center, adapter plate 62 has a clearance hole 106 that enables operative coupling of gear drive 36 with valve stem 54 using coupler 38.

Gear drive housing 102 has opposite end faces from which protrude opposite ends 110, 112 of a main shaft 114. Flange 100 surrounds protruding shaft end 112 at one end face. A further flange 116 of housing 102 surrounds protruding shaft end 110 at the opposite end face. Bracket 40, which includes adapter plate 62 as part of the overall assembly mounted on gear drive 36, serves to mount closure system 30 on valve body 48. Coupler 38 is assembled to shaft end 112 for aligning with and fitting to valve stem 54 when the closure system is in place.

Housing 102 also has a side face comprising a flange 120 that is disposed at a right angle to flanges 100, 116. A flange 122 of air motor 34 is fastened to flange 120 for mounting the air motor on the gear drive.

Gear drive 36 further comprises a stub shaft 124 whose axis is transversely perpendicular to the axis of main shaft 110. One end of stub shaft 124 protrudes from housing 102 where it is surrounded by flange 122 and coupled by coupler 37 to the air motor shaft.

Within the enclosed interior of housing 102 is a beveled gear set 126. One gear 128 of the set is disposed on the inner end of stub shaft 124, while the other gear 130 of the set is disposed on the interior of main shaft 110. Rotation of either one of the two shafts rotates the other via gear set 126.

The gear set is provided with a suitable gear ratio that multiplies the air motor torque so that the actual torque that turns the valve shaft exceeds the torque that the motor would apply if it were directly coupled to the valve stem without the torque multiplication provided by the gear set. For a given valve closure torque requirement, this means that the torque that an air motor delivers can be smaller when compared to the prior valve closure system of the commonly owned patent mentioned above.

Air motor 34 is a commercially available air motor having an output shaft 143 at the one axial end containing flange 122. A fitting 144 is installed in an air supply port 146 at the opposite axial end. A pneumatic line (not shown) connects to fitting 144 to provide pressurized air for operating motor 34 such that the motor output shaft turns in the proper sense for closing the valve when called upon to do so.

Both female drive couplers 37, 38 are generally cylindrical. Coupler 37 adapts the square drive of the motor shaft to that of the outer end of stub shaft 124. Coupler 38 adapts the square drive of gear drive shaft end 112 to that of the valve stem. Coupler 38 has an off-center transverse through-hole 150 that intersects the portion that fits onto shaft end 112. A spring pin 152 (FIG. 28) is pressed into that hole after the coupler is fit onto the shaft end.

The shaft end has an elongate notch 154 parallel to the shaft length, and spring pin 152 passes through notch 154, causing the coupler to be kept on the shaft end, but allowing the coupler to position itself axially along the shaft end. The lost motion allows for some tolerance in length of valve stem and extent of stem displacement while turning. The limited displacement travel serves to accommodate axial travel of the valve stem as the stem is being rotated, but it does not allow coupler 38 to lose driving engagement with the valve stem while the system remains installed. Because notch 154 is machined in an outer surface of the shaft end, rather than through the shaft end, the shaft end is endowed with increased strength.

FIG. 28 shows valve closure system 30 in operative association with shut-off valve 32, although system 30 differs in certain respects that will be described later. Locking plates 66 are swung closed to lodge their inner margins in groove 59. Locking pins 42, 44 are inserted into appropriate ones of holes 82 with their distal ends passing through base plate 68 and clearance to the base plate being provided by the registration of notches 94 with holes 82. The distal end of one of the two pins presents an interference to the side wall of valve port 52. The two locking plates fit together circumferentially girdling the valve body at groove 59, and base plate 68 also circumferentially girdles the valve body around body portion 60.

With valve 32 open, operation of air motor 34 acts through gear drive 36 to turn the valve stem in a sense that closes the valve. The interference presented to the side wall of valve port 52 by the distal end of one of the two locking pins reacts the torque to prevent bracket 40 from turning on the valve body.

Removal of the closure system from the valve can be easily accomplished by the following steps. Locking pins 42, 44 are extracted using the pull-rings 158 at their proximal ends and removed from the assembly, thereby unpinning locking plates 66 from base plate 68. The locking plates can now be swung clear of the valve groove, and the bracket disengaged from the valve by bodily moving it along the direction of axis 56 away from the valve.

Installation of valve closure system 30 can be made by a reverse sequence of steps. The closure system is installed on a shut-off valve when the valve is open. The shape imparted to the inside edge of base plate 68 by notches 94 endows bracket 40 with the ability to be indexed on the valve body at several different orientations about axis 56. With locking plates 66 swung open, bracket 40 is fit onto the valve body at the desired degree of indexing. Then the locking plates are swung closed, and locking pins 42, 44 inserted.

Because system 30 is intended as strictly a valve closure system, motor 34 is rendered uni-directional in the manner described above so that when pneumatic power is applied to port 146 via fitting 144, shaft 110 will rotate only in the direction that produces valve closing. Any reaction torque that might tend to turn the bracket on the valve body when motor 34 is operated to close shut-off valve 32 will result in abutment of one of the locking pins with the side of the valve port that prevents bracket turning. The system is however operable bi-directionally for both opening and closing valve 32 manually by engaging a suitable tool with shaft end 114 and turning it in the desired direction. Therefore, if the motor has been operated to close the valve, the valve can be manually re-opened without having to remove the system from the valve. Making motor 34 capable of bi-directional operation would of course also enable the motor to both open and close the valve.

Figure 31:
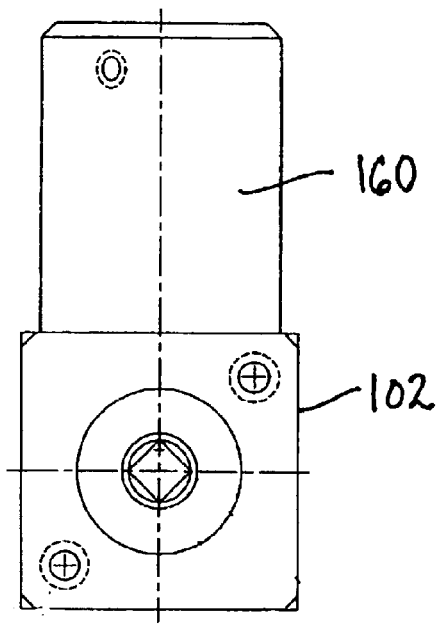
FIG. 31 is an enlarged view in the direction of arrows 31—31 in FIG. 28.
Figure 32:
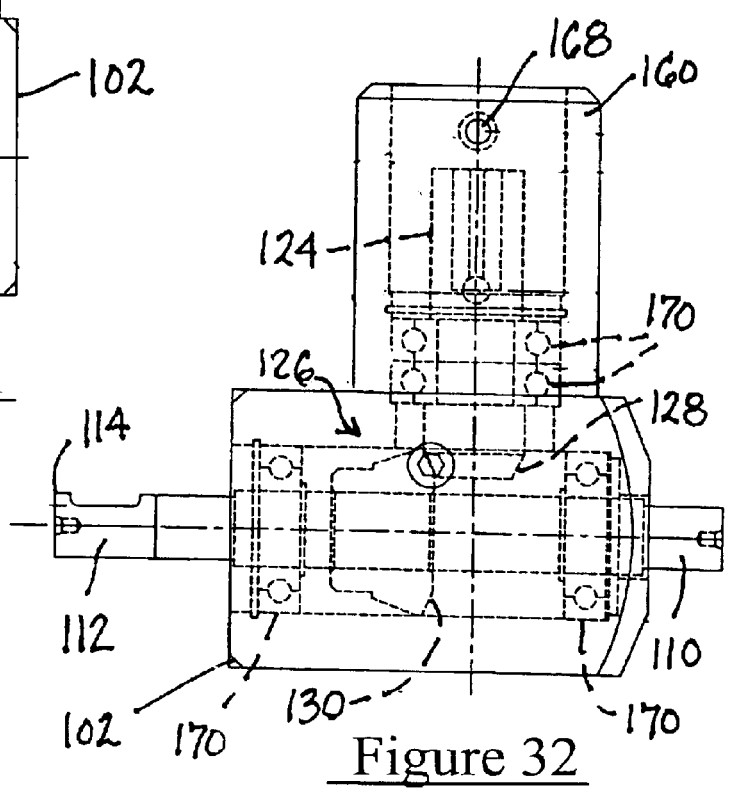
FIG. 32 is a right side elevation view of FIG. 31.
Figure 33:
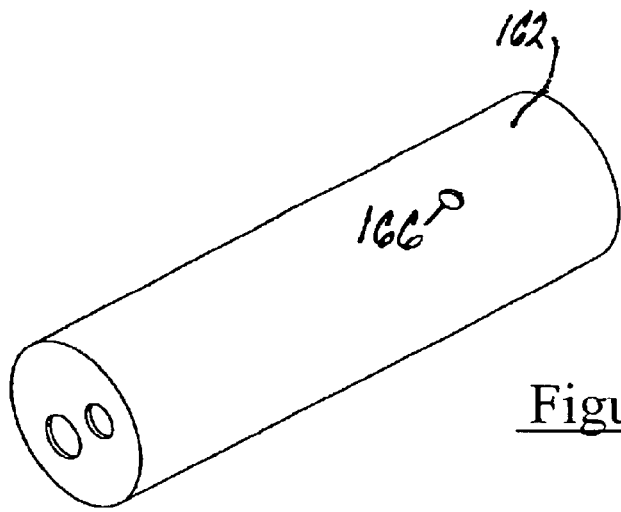
FIG. 33 is a perspective view of another part shown in FIG. 28.

The system 30 shown in FIG. 28 differs from the previous Figures in that it has a modified form of gear drive 36. The same reference numerals serve to identify parts previously described. Housing 102, shown by itself in FIGS. 31 and 32, no longer has distinct flanges, thereby eliminating the need for adapter plate 62 and air motor mounting flange 122. A cylindrical wall 160 of housing 102 surrounds the protruding end of input shaft 124.

Air motor 34 comprises a cylindrical housing 162 that extends axially beyond the end of motor shaft 143 to telescopically fit over wall 160. Motor 34 is secured to the gear drive housing via three fasteners 164 arranged 120° apart to pass through holes 166 in housing 162 and thread into holes 168 in wall 160. As the motor is being telescoped over wall 160, the motor shaft 143 comes into operative coupling with input shaft 124.

The axes of shafts 114, 124 intersect at 90° within the gear drive housing interior, and each shaft is journaled on gear drive housing 102 by ball bearing assemblies 170.

While a presently preferred embodiment of the invention has been illustrated and described, it should be appreciated that principles of the invention are applicable to all embodiments that fall within the scope of the is claims that follow hereinafter.

What is claimed is:

1. A valve operating system for turning an actuator of a valve about an axis relative to a body of the valve to operate the valve between first and second positions, in one of which the valve is open and in the other of which the valve is closed, the system comprising:
   a motor having a rotatable shaft;
   a bracket for associating the valve operating system with the valve; and
   an operative coupling for causing rotation of the motor shaft to turn the valve actuator to operate the valve;
   wherein the bracket is constructed and arranged for fitting onto the valve and comprises a) a ring for coaxially encircling the valve body axially beyond a radially outwardly open groove in the exterior of the valve body, b) locking parts that are disposed axial of the ring and positionable on the bracket for selective engagement with, and disengagement from, the groove to axially lock the bracket to the valve body when engaged with the groove and to axially unlock the bracket from the valve body when disengaged from the groove, and c) additional parts for locking each locking part to the ring when the respective locking part is engaged with the groove and presenting a dimensional interference to the valve body to restrict turning of the bracket on the valve body as the motor operates the valve.

2. A valve operating system as set forth in claim 1 in which at least one of the additional parts both locks the respective locking part to the ring when the respective locking part is engaged with the groove and presents a dimensional interference to the valve body to restrict turning of the bracket on the valve body as the motor operates the valve.

3. A valve operating system as set forth in claim 2 in which the at least one additional part comprises a locking pin that passes through both a through-hole in the respective locking part and a clearance notch in an inner margin of the ring.

4. A valve operating system as set forth in claim 3 in which the locking part through which the locking pin passes comprises a flat locking plate that has a generally semi-circular shape and that is pivoted on the bracket for swinging about a pivot axis between a locking position where an inner margin of the locking plate fits in the groove in the valve body and an unlocking position where the inner margin of the locking plate is free of the groove.

5. A valve operating system as set forth in claim 4 in which the locking plate comprises a series of through-holes through any one of which the locking pin can pass, and the ring comprises a flat generally circular plate having a series of clearance notches in its inner margin.

6. A valve operating system as set forth in claim 1 in which each locking part comprises a flat locking plate that has a generally semi-circular shape and that is pivoted on the bracket for swinging about a respective pivot axis between a locking position where an inner margin of the respective locking plate fits in the groove in the valve body and an unlocking position where the inner margin of the respective locking plate is free of the groove, and in their locking positions, the locking plates encircle the valve body.

7. A valve operating system as set forth in claim 6 in which each locking plate comprises a series of through-holes, the ring comprises a generally circular flat plate having a series of clearance notches in its inner margin, each of which notches registers with a respective through-hole in the locking plates when the locking plates are in locking position, and the additional parts include locking pins, each of which passes through both a through-hole in the respective locking plate and corresponding clearance notch in the ring, at least one of the locking pins protruding axially beyond the corresponding clearance notch to present a dimensional interference to the valve body for restricting turning of the bracket on the valve body as the motor operates the valve.

8. A valve operating system as set forth in claim 7 in which the bracket further comprises respective posts on which respective locking plates are pivoted, and respective fasteners that fasten the respective posts to the ring.

9. A valve operating system as set forth in claim 8 further including a gear drive that comprises a gear set housed within a gear drive housing for placing the valve actuator in driven relation to the motor, and additional fasteners for fastening the posts to the gear drive housing.

10. A valve operating system as set forth in claim 9 in which the gear drive comprises an input shaft journaled on the gear drive housing coaxial with the motor shaft and an output shaft journaled on the gear drive housing coaxial with the valve actuator, and the gear set comprises a bevel gear set for coupling the input and output shafts at 90° to each other and amplifying the motor torque for turning the valve actuator.

11. A valve operating system as set forth in claim 1 further including a gear drive that comprises a gear set housed within a gear drive housing for placing the valve actuator in driven relation to the motor.

12. A valve operating system as set forth in claim 11 in which the gear drive comprises an input shaft journaled on the gear drive housing coaxial with the motor shaft and an output shaft journaled on the gear drive housing coaxial with the valve actuator, a coupler on the exterior of the gear drive housing for coupling an end of the output shaft with the valve actuator, and the gear set comprises a bevel gear set coupling the input and output shafts at 90° to each other and amplifying the motor torque for turning the coupler.

13. A valve operating system as set forth in claim 12 in which the gear drive further includes an override on the exterior of the gear drive housing for turning the output shaft of the gear drive from a source other than the input shaft.

14. A valve operating system as set forth in claim 1 in which the motor comprises an air motor.

15. A valve operating system for turning an external actuator of a valve about an axis relative to a body of the valve to operate the valve between first and second positions, in one of which the valve is open and in the other of which the valve is closed, the system comprising:
   a motor having a rotatable shaft;
   a mount for separably associating the valve operating system with the valve; and
   an operative coupling for causing rotation of the motor shaft to turn the valve actuator to operate the valve;
   wherein the operative coupling comprises a gear drive that comprises a gear set housed within an interior of a gear drive housing for placing the valve actuator in driven relation to the motor, the gear drive comprises an input shaft journaled on a gear drive housing coaxial with and having a protruding end coupled to the motor shaft, an output shaft journaled on the gear drive housing coaxial with the valve actuator, a coupler coaxial with both the output shaft and the actuator for coupling a protruding end of the output shaft coaxially with the valve actuator, and a bevel gear set within the interior of the housing coupling the input and output shafts at 90° to each other and amplifying the motor torque for turning coupler.

16. A valve operating system as set forth in claim 15 in which the motor comprises an air motor.

17. A valve operating system for turning an actuator of a valve about an axis relative to a body of the valve to operate the valve between first and second positions, in one of which the valve is open and in the other of which the valve is closed, the system comprising:
   a motor having a rotatable shaft;
   a mount for associating the valve operating system with the valve; and
   an operative coupling for causing rotation of the motor shaft to turn the valve actuator to operate the valve;
   wherein the operative coupling comprises a gear drive that comprises a gear set housed within an interior of a gear drive housing for placing the valve actuator in driven relation to the motor, the gear drive comprises an input shaft journaled on a gear drive housing coaxial with and having a protruding end coupled to the motor shaft, an output shaft journaled on the gear drive housing coaxial with the valve actuator, a coupler coupling a protruding end of the output shaft with the valve actuator, and a bevel gear set within the interior of the housing coupling the input and output shafts at 90° to each other and amplifying the motor torque for turning coupler, and
   in which the output shaft comprises an opposite end that protrudes from the gear drive housing at a location opposite the coupler and can be engaged by a tool for turning the output shaft and coupler independently of the motor.

18. A valve operating system for turning an actuator of a valve about an axis relative to a body of the valve to operate the valve between first and second positions, in one of which the valve is open and in the other of which the valve is closed, the system comprising:
   a motor having a rotatable shaft;
   a mount for associating the valve operating system with the valve; and
   an operative coupling for causing rotation of the motor shaft to turn the valve actuator to operate the valve;
   wherein the operative coupling comprises a gear drive that comprises a gear set housed within an interior of a gear drive housing for placing the valve actuator in driven relation to the motor, the gear drive comprises an input shaft journaled on a gear drive housing coaxial with and having a protruding end coupled to the motor shaft, an output shaft journaled on the gear drive housing coaxial with the valve actuator, a coupler coupling a protruding end of the output shaft with the valve actuator, and a bevel gear set within the interior of the housing coupling the input and output shafts at 90° to each other and amplifying the motor torque for turning coupler, and
   in which the gear drive housing comprises a cylindrical wall surrounding the protruding end of the input shaft, and the motor comprises a cylindrical housing that surrounds an end of the motor shaft and is telescopically fit to the cylindrical wall.

19. A valve operating system as set forth in claim 18 in which the cylindrical housing of the motor telescopically fits over the outside of the cylindrical wall of the gear drive housing, and further including fasteners for fastening the motor housing to the cylindrical wall of the gear drive housing.

20. A bracket for associating a valve operating system having a motor for turning an actuator of a valve about an axis relative to a body of the valve to operate the valve between first and second positions, in one of which the valve is open and in the other of which the valve is closed, the bracket comprising:
   a) a ring for coaxially encircling the valve body axially beyond a radially outwardly open groove in the exterior of the valve body, b) locking parts that are disposed axial of the ring and positionable on the bracket for selective engagement with, and disengagement from, the groove to axially lock the bracket to the valve body when engaged with the groove and to axially unlock the bracket from the valve body when disengaged from the groove, and c) additional parts for locking each locking part to the ring when the respective locking part is engaged with the groove and presenting a dimensional interference to the valve body to restrict turning of the bracket on the valve body as the motor turns the valve actuator.

21. A bracket as set forth in claim 20 in which at least one of the additional parts both locks the respective locking part to the ring when the respective locking part is engaged with the groove and presents a dimensional interference to the valve body to restrict turning of the bracket on the valve body as the motor operates the valve and comprises a locking pin that passes through both a through-hole in the respective locking part and a clearance notch in an inner margin of the ring to protrude axially beyond the ring for presenting a dimensional interference to the valve body for restricting turning of the bracket on the valve body as the motor turns the valve actuator.

22. A bracket as set forth in claim 21 in which the locking part through which the locking pin passes comprises a flat locking plate that has a generally semi-circular shape and that is pivoted on the bracket for swinging about a pivot axis between a locking position where an inner margin of the locking plate fits in the groove in the valve body and an unlocking position where the inner margin of the locking plate is free of the groove, the locking plate comprises a series of through-holes through any one of which the locking pin can pass, and the ring comprises a flat generally circular plate having a series of clearance notches in its inner margin.

* * * * *